(12) United States Patent
Moore

(10) Patent No.: US 8,311,278 B2
(45) Date of Patent: Nov. 13, 2012

(54) METHOD AND SYSTEM FOR AUTOMATED SUBJECT IDENTIFICATION IN GROUP PHOTOS

(75) Inventor: Lee C. Moore, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 534 days.

(21) Appl. No.: 12/644,434

(22) Filed: Dec. 22, 2009

(65) Prior Publication Data

US 2011/0150273 A1 Jun. 23, 2011

(51) Int. Cl.
*G06K 9/00* (2006.01)
(52) U.S. Cl. ........................ 382/103; 340/5.61
(58) Field of Classification Search .................. 382/103, 382/100, 115; 340/5.61
See application file for complete search history.

(56) References Cited

U.S. PATENT DOCUMENTS

| | | | |
|---|---|---|---|
| 2006/0215879 A1* | 9/2006 | Whitaker | 382/103 |
| 2008/0136588 A1* | 6/2008 | Carter et al. | 340/5.61 |

OTHER PUBLICATIONS

Arnell et al.; Photos and connections; by TIMO/Sep. 26, 2007; webpages (3); nearfield.org.
Arnell et al.; The RFID photo booth; by TIMO/Aug. 19, 2008; webpages (6); nearfield.org.

* cited by examiner

*Primary Examiner* — Claire X Wang
(74) *Attorney, Agent, or Firm* — Michael J. Nickerson; Basch & Nickerson LLP

(57) ABSTRACT

A system to automatically attach subject descriptions to a digital image containing one or more subjects is described. The system comprises a camera a set of remotely readable badges attached to the subjects, where each badge has a readable identification, a receiver to read the badges where the receiver can determine both the identification of each badge and the location of each badge, and a processor to combine the digital image and the identification and location information is described. By accessing a database containing the subject identification associated with each badge identification the processor can attach subject identification information to each subject in the image.

18 Claims, 4 Drawing Sheets

METHOD AND SYSTEM FOR AUTOMATED SUBJECT IDENTIFICATION IN GROUP PHOTOS

BACKGROUND

For many events, it is common to take a group photograph of the participants. This photograph, along with others, may be distributed as a "memory book" to the participants. A desirable feature of these memory books is to label one or more of the photographs with the names of the participants. These names may be included as inserts into the photograph or the names may be included as a caption. Furthermore, the memory book might contain more than the group photograph; therefore, it would be desirable to identify the subjects in each photograph.

FIG. 1 shows, in graphic form, a typical group photograph with labels identifying each subject in the photograph.

In FIG. 1, the group photograph 102 has been modified to add a caption, 104, identifying the event at which the photograph was taken, and in addition each individual in the photograph is identified by a text box containing the person's name near each person. An example of such label is 106.

Identifying and labeling each subject in a group photograph is a time consuming and error-prone process. Furthermore the identification can only be carried out by someone who is familiar with all of the potential subjects in the photographs.

Furthermore when many photographs are taken at an event, it is desirable to select a subset of the photographs that have some common feature. Commonly, this common feature is to include a set of photographs of an individual or individuals from the complete set of photographs from the event. To do this selection manually is very time consuming and hence expensive. Automating the process of identifying subjects in a photograph would create the opportunity to offer a variety of customized photographic records.

BRIEF DESCRIPTION OF THE DRAWING

The drawings are only for purposes of illustrating various embodiments and are not to be construed as limiting, wherein.

DETAILED DESCRIPTION

Figure 1:
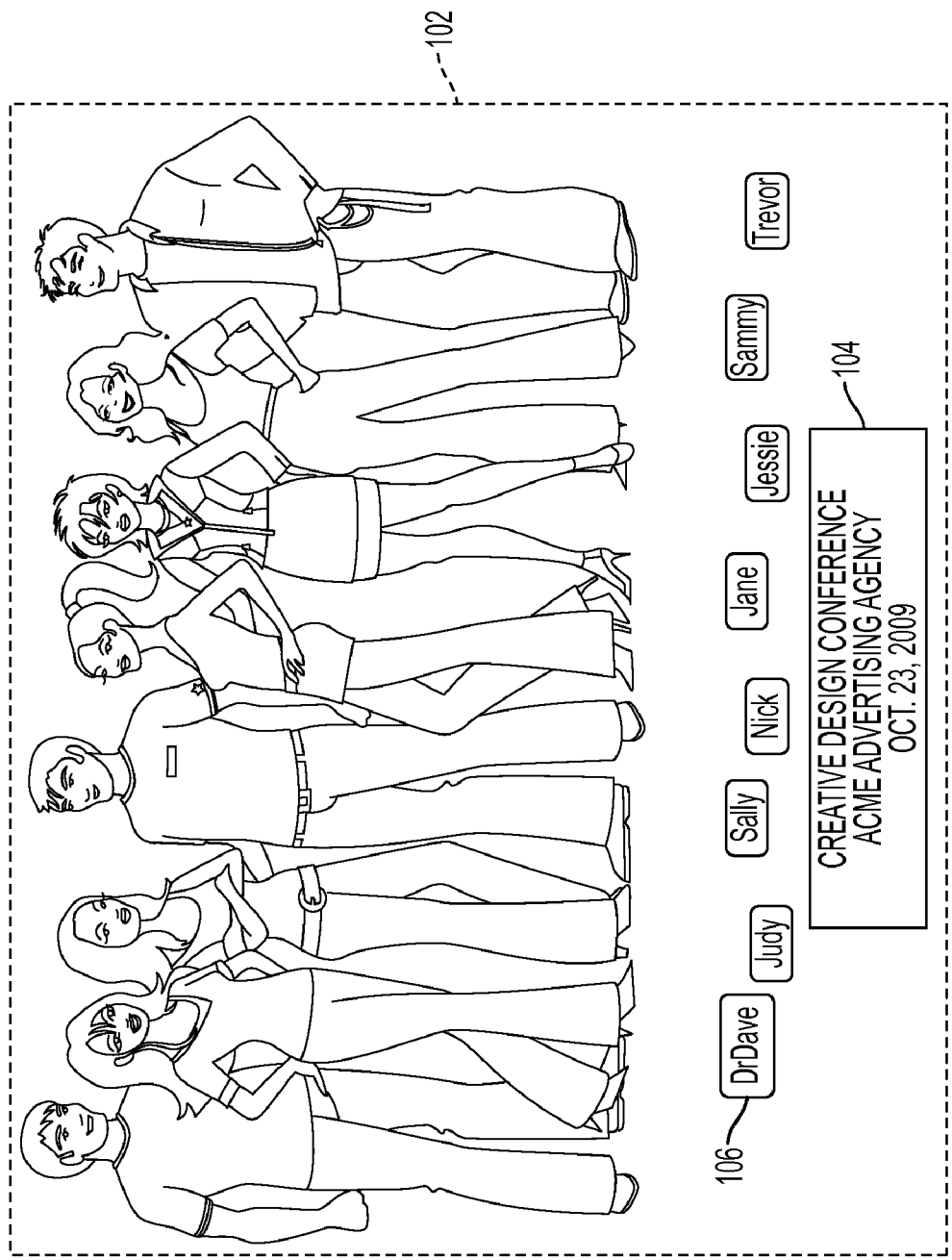
FIG. 1 illustrates a group photograph with labels identifying each subject.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

Figure 2A:
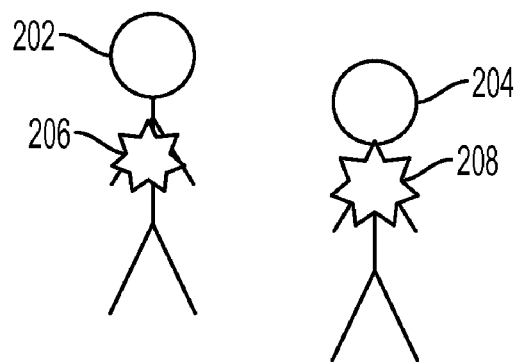
FIG. 2 illustrates in block diagram form a system for automatically identify subjects in a digital image.
Figure 2B:
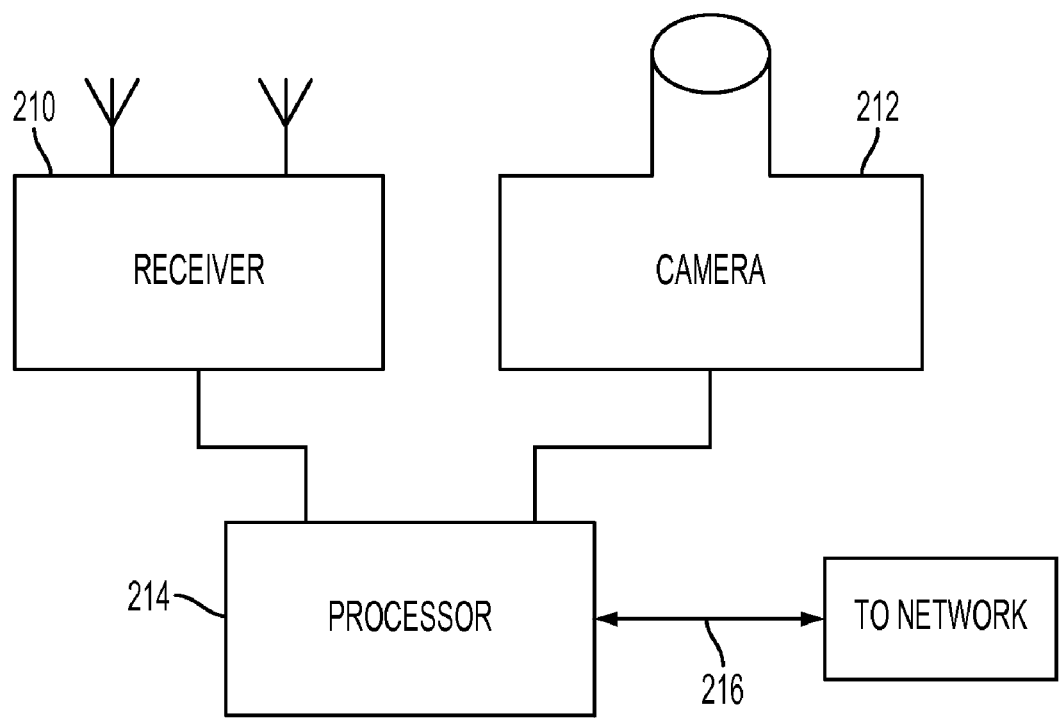

FIG. 2 illustrates a layout of a system that can automatically identify a plurality of subjects in a photograph. Each of the subjects of the photograph, 202 and 204, is supplied with an identification badge 206 and 208. Usage of such identification badges is common at many events. The badges in the present disclosure differ from the simple printed name tags that are commonly used in that each badge also contains an identification component.

The identification component can either be embedded in the actual name tag, or the component can be included as part of a holder of a printed identification. The identification components to be used are associated with a receiver, 210, that can read the identification information for each of the badges in a neighborhood around the receiver.

Technologies to perform remote reading of identification information from a device are available that use radio frequency technology to perform the remote reading function. Furthermore, receivers are available that can determine the location of each badge relative to the receiver as well as reading the identification information.

The receiver, 210, is placed in a known position relative to a recording device 212 that is used to take the picture. The recording device 212 may be a video camera or a still camera. In the following discussion, the use of a digital camera is used, as the recording device 212, for illustrative purposes.

The known position can be determined by a mechanical structure rigidly linking the receiver 210 and the camera 212. An alternative embodiment would add an additional badge attached to the camera 212. The receiver 210 would then receive the location of the camera badge along with the locations of the badges attached to the subjects of the picture. Thus, the location of the camera 212 relative to the receiver 210 could be automatically determined at the same time as the locations of the subjects are determined.

Both the receiver 210 and the recording device 212 are connected to a processor, 214. The processor 214 receives location information from the receiver 210. The location information and the corresponding badge identification are sent to the processor 214. The processor 214 also has an interface to a computer network, 216, to enable the processor 214 to send or receive data from a remote location.

The processor 214 could contain a microprocessor or similar computing element to perform the computations needed to compute the location of each badge and to modify the digital image to include the location information as well as to add other data to the metadata part of the digital image.

The receiver, 210, measures the location of each badge relative to itself. Since the location of the receiver 210 with respect to the camera, 212, is known, the location of each badge relative to the camera 212 is known as well. The locations of the subject badges relative to the receiver 210 can be combined with the location of the camera badge relative to the receiver 210 to allow a transformation to determine the location of each subject badge relative to the camera.

When a single receiver unit 210 is not capable of detecting the full three dimensional location of each badge relative to itself, combinations of individual receiver units 210 can be used to generate the full three dimensional information. For example, individual receiver units 210 capable of detecting only the distance to a badge can be combined to generate a three dimensional location. In such a case, the three individual units 210 can be fixed in relation to each other and to the camera 212 and the distance readings from each receiver 210 combined to determine the three dimensional location of each badge relative to the camera 212.

Such a determination can be made when the three distances are known since each distance defines the location of a badge to be on the surface of a sphere with the receiver unit 210 at the center. By using three receiver units 210, the badge location will be defined as the point that is common to the intersection of the three spheres. In order to allow for inherent uncertainty in the location distance, the badge could be considered to be located in a thin spherical shell centered on each of the receivers 210. The badge location could then be determined to be at the centroid of the region common to the three shells of the three receivers. Geometric algorithms to define the intersection of three spheres or three spherical shells are well known.

When there is more than one receiver 210 it is necessary to compute the distance by combining the individual receiver measurements. Each receiver 210 can send its location information to the processor 214. The processor 214 could convert the individual receiver data into a full three dimensional location of each badge relative to the receivers 210 and then using the known position of the camera 212 relative to the receiver 210 to compute the location of each badge relative to the camera 212.

Once a picture is taken, the location of each subject can be mapped by the processor 214 from the three dimensional location with respect to the camera 212 to the two dimensional position of the image of the subject in the digital image produced by the camera 212.

It is common for digital cameras to include information that is not actually part of the image but carries information about the image. For example, the JPEG format includes a provision for including information such as the exposure information, or the date along with the image part of the image. The JPEG format is commonly used in digital cameras. The EXIF standard for the metadata part of a JPEG image includes provision for comments or identification information as well as the technical parameters of the photograph.

Knowing the parameters of the camera, in particular the focal length of the lens being used, the computation of the two dimensional location on the image plane of each badge can be carried out by the processor. The focal length of the lens at the time of the exposure is commonly included in the metadata information from modern digital cameras.

Hence the two dimensional location of each badge in the digital image can be combined with the unique identification of each badge to generate a set of location/identification pairs. These pairs can be inserted by the processor 214 into the metadata part of the digital image to produce a modified image. Thus, the modified image will carry information that will allow the image of the wearer of the badge to be located in the image.

At events when a user is assigned an identification badge, the badge contains other information besides the user's name. For example, at some events the badge may contain magnetic stripes or similar electronically readable media that allow a user to identify him or herself to vendors who may be attending the event. Another usage allows the badge to give the holder access to restricted events or locations.

There is commonly associated with the issuance of an identification badge a registration process. During the registration process a database might be constructed containing the unique badge identification along with the name and other identification of the user. By using the unique identification associated with the badge then it is possible also retrieve specific user identification information such as a user name.

The user identification can be entered into the metadata part of an image along with the badge identification and subject location information. Alternatively, the user information could be added at a later stage, for example, when the image is stored in a database.

Processing can now proceed to label the subjects in the image. By transforming the subject identification into some human readable form, such as text, the transformed subject identification information can be superimposed on the digital image. Since the two dimensional location of the subject in the digital image is known, the transformed subject identification can further be superimposed adjacent to the subject image. In particular, the subject name can be superimposed near the subject image, thus labeling the subject for ease of identification.

An alternative embodiment would collect the human readable form of the subject information from all the subjects and place it so that the collective information is arranged in an order that matches the arrangement of the subjects themselves and then the collective information could be added to the digital image as a caption. Such a collective information arrangement is commonly used with pictures of sports teams for example. In such a case the collective information is not embedded in the image itself but placed along one of the margins of the image. The caption can be placed inside of the margin of the image overwriting part of the digital image. Alternatively, the digital image can be enlarged by adding blank space adjacent to an edge of the digital image and then writing the caption in the newly added blank space.

Once the processor 214 has identified each subject and the location of the subject image within the digital image, and has inserted the subject identification and subject image location into the metadata part of the digital image, the modified digital image can be stored in a remote location via network interface 216. Alternatively, the processor 214 can store one or more modified digital images in its memory and transfer the stored images at a later time by other means, for example by transfer to a flash drive.

A benefit of the system described herein is that it enables the users of the system to compile customized collections of photographs from an event. It is not uncommon for many photographs to be taken at an event other than a large group picture. Since the system herein described adds the subject identification to the metadata of each image, it is possible to select images from a set of images taken during an event in a variety of ways. For example, a set of images could be compiled from a larger set that includes a particular individual. This could be accomplished by searching through the metadata of all images from the event and identifying those images that contain the particular individual. An alternate embodiment might add some information that identifies each image with the database that contains the user information. Then it would be a simple matter to access the database to identify the images associated with a particular individual.

Figure 3:
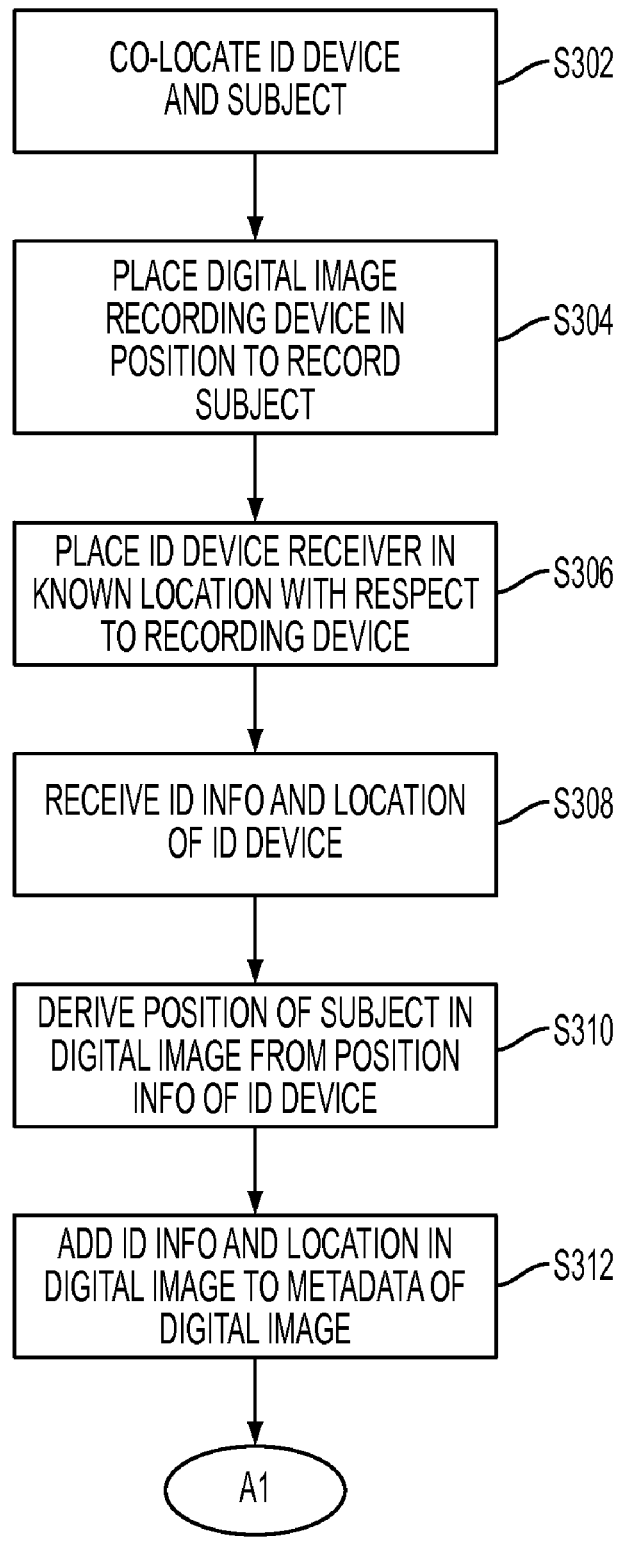
FIGS. 3 and 4 illustrate the flow diagram of a method to automatically identify subjects in a digital image.

FIG. 3 shows a method for locating a subject in a digital image. In step S302, an identification device is co-located with a subject to be imaged. The identification device has unique identification information associated with it. The identification device is further capable of being read by an external receiver where the external receiver can determine the location of the identification device relative to itself.

In step S304, a recording device is placed in position to be able to record a digital image of the subject. More than one subject may be in the field of view of the recording device at one time.

In step S306, a receiver capable of reading the identification information of the identification device and further capable of reading the location of the identification device relative to itself is placed in a predetermined location relative to the recording device.

In step S308, the digital image is received from the recording device and the location and identification information is received from the receiver.

In step S310, the location of the image of the subject within the digital image is derived by using the location information received together with known properties of the digital recorder.

These properties might include the focal length of a lens being used by the recorder, or other properties as needed.

When there is more than one tagged and identified subject then the position of each subject is separately derived.

In step S312, the digital image is modified by adding the identification information and the subject image location to the metadata part of the digital image for each subject in the image.

Figure 4:
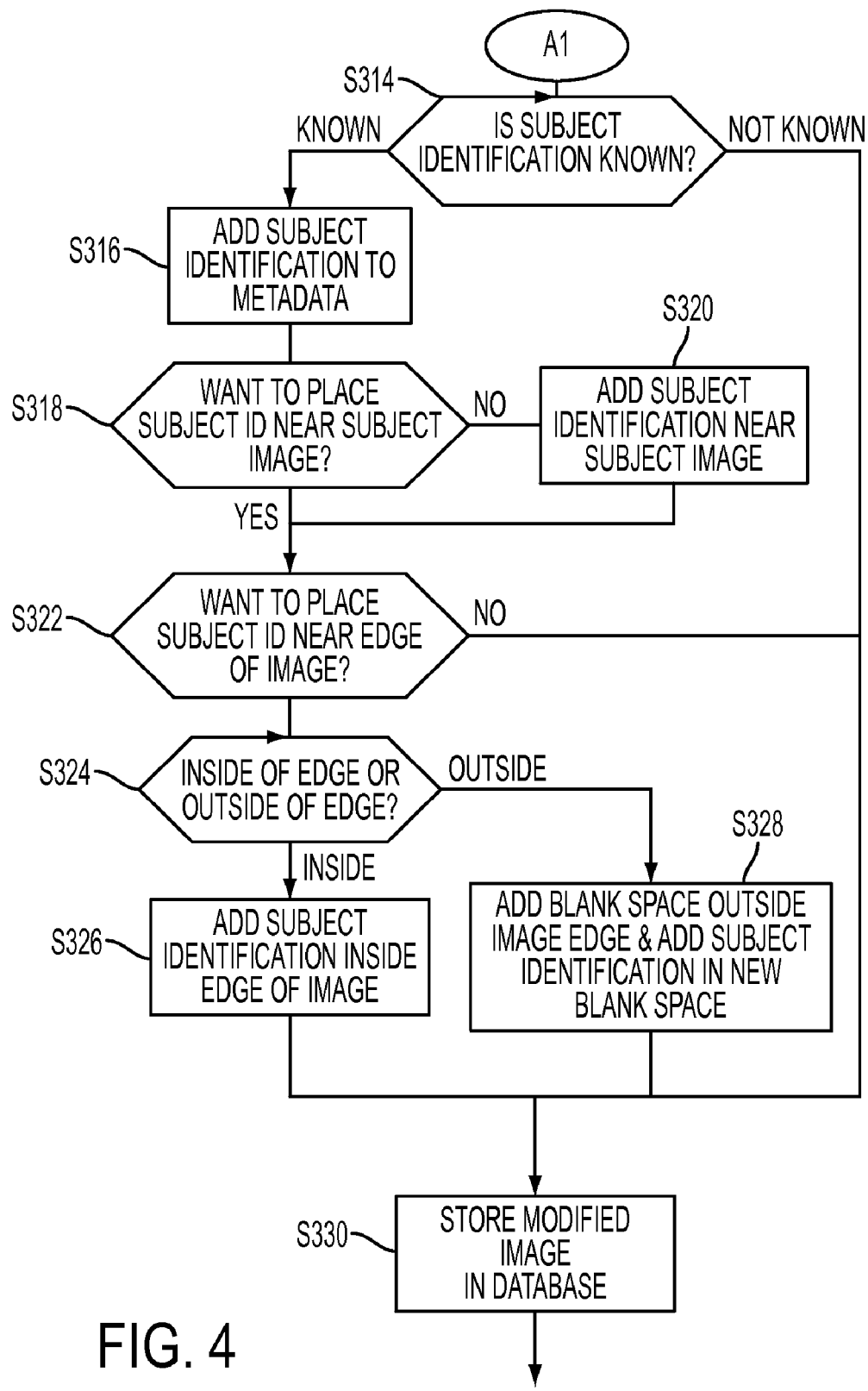

In step S314 of FIG. 4, a check is made to see if the subject identification is known. This information might be derived by using the identification information of the identifying device to look up the corresponding subject information in a database. The subject identification might include such data as the subject name as well as other information as desired.

When the subject identification information is known, in step S316 of FIG. 4, the subject identification is added to the metadata part of the digital image along with the previously inserted metadata information containing the identification information and the subject image location. When subject identification information is not known control proceeds to step S330 of FIG. 4.

In step S318 of FIG. 4, a check is made to see if it is desired to add the subject identification directly in the digital image near the image of the subject. This subject information might include for example, alphanumeric characters encoding the subject information. If such a placement is desired, the appropriate imaginal version of the subject identification is generated and added to the digital image in a location near the subject image location in step S320 of FIG. 4.

In step S322 of FIG. 4, a check is made to see if it is desired to add the subject identification directly in the digital image near an edge of the image. If such a placement is desired, a further check is made, in step S324 of FIG. 4, to see if the information is to be added near the edge of the image inside of the image or outside of the edge. When it is desired to add the subject identification near but inside the edge of the digital image an appropriate imaginal version of the subject identification is generated and added to the digital image in a location near the inside edge of the image in step S326 of FIG. 4. When the placement is desired outside of the edge of the digital image, in step S328 of FIG. 4, the image is first modified to add blank image content adjacent to the edge of the digital image and the appropriate imaginal version of the subject identification is generated and added to the digital image in a location in the newly created blank space outside of the edge of the digital image.

At step S330 of FIG. 4, the modified digital image is stored. Such storage might include storing the image in a database. The database might include the subject identification as a separate entry or the subject information may be obtained by reading the metadata of the stored image.

A way to automatically identify the subjects in a photograph to eliminate the effort needed to do so manually and to eliminate the need for a person who is familiar with all of the subjects might be a system comprising: a digital recorder for converting a scene, within a field of view of said digital recorder, into digital image data; an identification device having identification information associated therewith, said identification device being co-located with a pre-determined subject; an identification device detector, positioned in a pre-determined relationship to said digital recorder, to detect a position of the identification device; a processor operatively connected to the digital recorder and the identification device detector, to determine if the position of the identification device is within the field of view of the digital recorder; said processor determining the position of the image of the pre-determined subject within the digital image data associated with said identification device when the position of said identification device is within the field of view of said digital recorder; the processor adding identification metadata to the digital image when the position of said identification device is within the field of view of the digital recorder, the identification metadata data including the identification information associated with the identification device and the image position of the identification device.

The system might further comprise: where the processor modifies the digital image metadata to include information identifying the pre-determined subject when the position of the identification device is within the field of view of the digital recorder.

The system might further comprise: where the processor modifies the digital image metadata to include information identifying a position in the digital image of the pre-determined subject when the position of the identification device is within the field of view of the digital recorder.

4. The system of claim 2 wherein the processor adds alphanumeric identification to the digital image where the alphanumeric identification is derived from the information identifying the predetermined subject.

The system might further comprise: where the alphanumeric information added to the digital image is placed in close proximity to the image of the predetermined subject.

The system might further comprise: where the alphanumeric information is placed adjacent to one edge of the digital image.

The system might further comprise: where the processor modifies the digital image by adding blank image data on one edge of the digital image, and where the processor places the alphanumeric information in the newly added part of the modified digital image.

The system might further comprise: where the identification device detector comprises two individual units and further wherein the processor combines the location information from each of the individual units to generate the position of the identification device relative to the recording device.

A way to automatically identify the subjects in the photographs to eliminate the effort needed to do so manually and to eliminate the need for a person who is familiar with all of the subjects might be a method comprising: recording a digital image of a predetermined subject using a recording device; placing an identification device in close proximity to the predetermined subject, where the identification device has unique identifiable information associated with it; placing an identification device detector in a predetermined location relative to the recording device, where the identification device detector is capable of determining the identification device's position relative to itself; determining that the predetermined subject is in the field of view of the recording device; determining the position in the digital image of the image of the predetermined subject; and adding metadata information to the digital image to generate a modified digital image, where the added metadata information includes the unique identifiable information from the identification device and the position of the predetermined subject in the digital image.

The method might further comprise: a system for automatically identifying a location of a subject in a digital image could be fashioned, comprising: a digital recorder for converting a scene, within a field of view of said digital recorder, into digital image data; an identification device having identification information associated therewith, said identification device being co-located with a pre-determined subject; an identification device detector, positioned in a pre-determined relationship to said digital recorder, to detect a position of the identification device; a processor operatively connected to the digital recorder and the identification device detector, to determine if the position of the identification device is within the field of view of the digital recorder; said processor determining the position of the image of the pre-determined subject within the digital image data associated with said identification device when the position of said identification device is within the field of view of said digital recorder; the processor adding identification metadata to the digital image when the position of said identification device is within the field of view of the digital recorder, the identification metadata data including the identification information associated with the identification device and the image position of the identification device.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for automatically identifying a location of a subject in a digital image, comprising:
 a digital recorder for converting a scene, within a field of view of said digital recorder, into digital image data;
 an identification device having identification information associated therewith, said identification device being co-located with a pre-determined subject;
 an identification device detector, positioned in a pre-determined relationship to said digital recorder, to detect a position of the identification device;
 a processor operatively connected to the digital recorder and the identification device detector and a computer network, to determine if the position of the identification device is within the field of view of the digital recorder;
 said processor determining the position of the image of the predetermined subject within the digital image data associated with said identification device when the position of said identification device is within the field of view of said digital recorder;
 said processor adding identification metadata to the digital image when the position of said identification device is within the field of view of the digital recorder, the identification metadata data including the identification information associated with the identification device and the image position of the identification device.

2. The system as claimed in claim 1, wherein said processor modifies the digital image metadata to include information identifying the pre-determined subject when the position of the identification device is within the field of view of the digital recorder.

3. The system as claimed in claim 2, wherein said processor modifies the digital image metadata to include information identifying a position in the digital image of the pre-determined subject when the position of the identification device is within the field of view of the digital recorder.

4. The system of claim 2 wherein said processor adds alphanumeric identification to the digital image where the alphanumeric identification is derived from the information identifying the predetermined subject.

5. The system of claim 4 wherein the alphanumeric information added to the digital image is placed in close proximity to the image of the predetermined subject.

6. The system of claim 4 wherein the alphanumeric information is placed adjacent to one edge of the digital image.

7. The system of claim 4 wherein said processor modifies the digital image by adding blank image data on one edge of the digital image, and where the processor places the alphanumeric information in the newly added part of the modified digital image.

8. The system of claim 1 wherein said identification device detector comprises two individual units and further wherein the processor combines the location information from each of the individual units to generate the position of the identification device relative to the recording device.

9. The system of claim 1 further comprising a database to store the modified digital image.

10. A method for locating a subject in a digital image comprising:
 recording a digital image of a predetermined subject using a recording device; placing an identification device in close proximity to the predetermined subject, where the identification device has unique identifiable information associated with it;
 placing an identification device detector in a predetermined location relative to the recording device, where the identification device detector is capable of determining the identification device's position relative to itself;
 determining if the position of the identification device is within a field of view of the recording device;
 determining, when the position of the identification device is within the field of view of the recording device, the position in the digital image of the image of the predetermined subject within the digital image; and
 adding metadata information to the digital image to generate a modified digital image, where the added metadata information includes the unique identifiable information from the identification device and the position of the predetermined subject in the digital image.

11. The method of claim 10 wherein the identification device detector comprises two individual units and further comprising combining the location information from each individual unit to generate the position of the identification device relative to the recording device.

12. The method of claim 10 further comprising adding metadata information identifying the predetermined subject.

13. The method of claim 12 further comprising adding alphanumeric information to the digital image where the alphanumeric information is determined by the content of the metadata information that identifies the predetermined subject.

14. The method of claim 13 further comprising placing the added alphanumeric information in close proximity to the image of the predetermined subject.

15. The method of claim 13 further comprising placing the added alphanumeric information adjacent to one edge of the digital image.

16. The method of claim 13 further comprising modifying the digital image by adding additional blank image content to one edge of the digital image and further placing the alphanumeric information in the additional blank image content.

17. The method of claim 10 further comprising storing the modified digital image in a database.

18. The method of claim 17 further comprising compiling a collection of digital images by selecting images from the database that contain predetermined metadata information.

* * * * *